US011404756B2

(12) United States Patent
Kim

(10) Patent No.: US 11,404,756 B2
(45) Date of Patent: Aug. 2, 2022

(54) POUCH FILM AND SECONDARY BATTERY INCLUDING THE SAME

(71) Applicant: SK INNOVATION CO., LTD., Seoul (KR)

(72) Inventor: Hyo Sang Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 16/702,041

(22) Filed: Dec. 3, 2019

(65) Prior Publication Data

US 2020/0185695 A1   Jun. 11, 2020

(30) Foreign Application Priority Data

Dec. 5, 2018  (KR) .......... 10-2018-0155380

(51) Int. Cl.
*H01M 50/60* (2021.01)
*H01M 50/73* (2021.01)
*H01M 10/04* (2006.01)
*H01M 10/058* (2010.01)
*H01M 50/30* (2021.01)

(52) U.S. Cl.
CPC ......... *H01M 50/73* (2021.01); *H01M 10/049* (2013.01); *H01M 10/058* (2013.01); *H01M 50/394* (2021.01); *H01M 50/60* (2021.01)

(58) Field of Classification Search
CPC .... H01M 50/394; H01M 50/60; H01M 50/73; H01M 10/049; H01M 50/116; H01M 50/543; H01M 50/557; H01M 10/058
USPC .......................................................... 429/51
See application file for complete search history.

(56) References Cited

U.S. PATENT DOCUMENTS

2007/0154803 A1* 7/2007 Kim .................. H01M 10/0525
429/185
2012/0208054 A1* 8/2012 Shirasawa ......... H01M 10/0468
429/90

FOREIGN PATENT DOCUMENTS

| EP | 1804313 A2 | 7/2007 |
| EP | 1804316 A2 | 7/2007 |
| KR | 20140046174 A * | 4/2014 |
| KR | 1020140046174 A | 4/2014 |
| KR | 20170059745 A * | 5/2017 |
| KR | 10-2018-0071799 | 6/2018 |

OTHER PUBLICATIONS

Convex Polygon. (2008). In D. Nelson (Ed.), The Penguin dictionary of mathematics (4th ed.). Penguin. Credo Reference: https://search.credoreference.com/content/entry/penguinmath/convex_polygon/0?institutionId=743.*
Extended European Search Report issued by the European Patent Office dated May 8, 2020.

* cited by examiner

*Primary Examiner* — Uyen M Tran
(74) *Attorney, Agent, or Firm* — IP & T Group LLP

(57) ABSTRACT

Embodiments of the present invention provides a pouch film. In manufacturing a secondary battery, a gas may be generated when reacting an electrode assembly with an electrolyte. After the generated gas is discharged, the pouch film may be sealed. In this case, a deformation part may be formed in the gas chamber section which serves as a passage for discharging the gas, specifically, in the gas chamber passage, thus to prevent the electrolyte from flowing backward and maintain shapes of the gas chamber inlet during injecting the electrolyte.

7 Claims, 2 Drawing Sheets

POUCH FILM AND SECONDARY BATTERY INCLUDING THE SAME

CROSS-REFERENCE TO RELATED APPLICATION

This application claims priority to Korean Patent Applications No. 10-2018-0155380 filed on Dec. 5, 2018 in the Korean Intellectual Property Office (KIPO), the entire disclosure of which is incorporated by reference herein.

BACKGROUND OF THE INVENTION

1. Field of the Invention

The present invention relates to a pouch film and a secondary battery including the same.

2. Description of the Related Art

In modern society, the demand for secondary batteries is rapidly increasing across the industry such as a mobile device or an automobile, and studies into the secondary battery are actively conducted.

The secondary battery includes an electrode assembly and a pouch film for housing the electrode assembly. The secondary battery is manufactured by forming a space to house the electrode assembly in the pouch film, then housing the electrode assembly in the space, followed by injecting an electrolyte and sealing the pouch film.

During injecting the electrolyte into the electrode assembly and then performing pre-charging, a gas may be generated. The gas generated during the pre-charging has to be discharged. The reason is that the secondary battery may swell if the gas is not discharged, which is disadvantageous in terms of strength or stability.

In this regard, the electrolyte may be injected through a gas chamber provided in the pouch film and the generated gas may be discharged to an outside. However, since the pouch film is prepared by mainly using a metal material having excellent elongation, it is difficult for the pouch film to maintain its original shape during injecting the electrolyte. In addition, when rapidly injecting the electrolyte into the pouch film, a case in which the electrolyte flows backward may also occur. Therefore, the need for a pouch film that helps to safely manufacture the secondary battery arises.

PRIOR ART DOCUMENT

Patent Document (Patent Document 1) Korean Patent Laid-Open Publication No. 10-2018-0071799 (published on Jun. 28, 2018)

SUMMARY OF THE INVENTION

It is an object of embodiments of the present invention to provide a pouch film that maintains an entire structure of a pouch in a process of injecting an electrolyte, or the like, thus to provide convenience in the process.

In addition, another object of embodiments of the present invention is to provide a pouch film having a structure that allows an electrolyte to be uniformly impregnated by inducing a flow of the electrolyte when injecting the same.

Further, another object of embodiments of the present invention is to provide a pouch film having a structure for maintaining shapes of a gas chamber inlet for injecting an electrolyte and a portion adjacent thereto.

To achieve the above objects, according to an aspect of the present invention, there is provided a pouch film including: a housing section configured to provide a space in which an electrode assembly is housed; and a gas chamber section formed integrally with the housing section and configured to discharge a gas generated by reacting an electrolyte with the electrode assembly to an outside, wherein the gas chamber section includes a gas chamber inlet formed on one side thereof so that the electrolyte is injected, and the gas chamber section includes a deformation part formed therein in a predetermined pattern to maintain shapes of the gas chamber inlet and a portion adjacent thereto.

Herein, the gas chamber inlet may be a part of the gas chamber section.

In addition, the deformation part may be formed in a concave or convex shape or is formed in a combination of the concave and convex shapes.

Further, the deformation part may have at least one of straight line, curve, polygonal, dot and circular shapes.

Further, the deformation part may control a flow of the electrolyte.

Further, the deformation part may be formed by insert molding.

According to another aspect of the present invention, there is provided a method of manufacturing a secondary battery, including: preparing a pouch film which includes: a housing section configured to house an electrode assembly; and a gas chamber section formed integrally with the housing section and configured to discharge a gas generated by reacting an electrolyte with the electrode assembly to an outside, forming a deformation part in a predetermined pattern in the gas chamber section, housing the electrode assembly in the housing section, injecting the electrolyte through a gas chamber inlet formed on one side of the gas chamber section, discharging a gas generated by the reaction between the electrolyte and the electrode assembly to the gas chamber section side, and removing the gas chamber section and sealing the housing section.

Herein, a plurality of deformation parts may be formed in the predetermined pattern.

In addition, the deformation part of the predetermined pattern may have at least one of straight line, curve, polygonal, dot and circular shapes.

According to embodiments of the present invention, it is possible to maintain the shape around the gas chamber inlet for injecting the electrolyte so as to facilitate an injection of the electrolyte by the deformation part.

In addition, it is possible to control a flow of the electrolyte by the deformation part.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
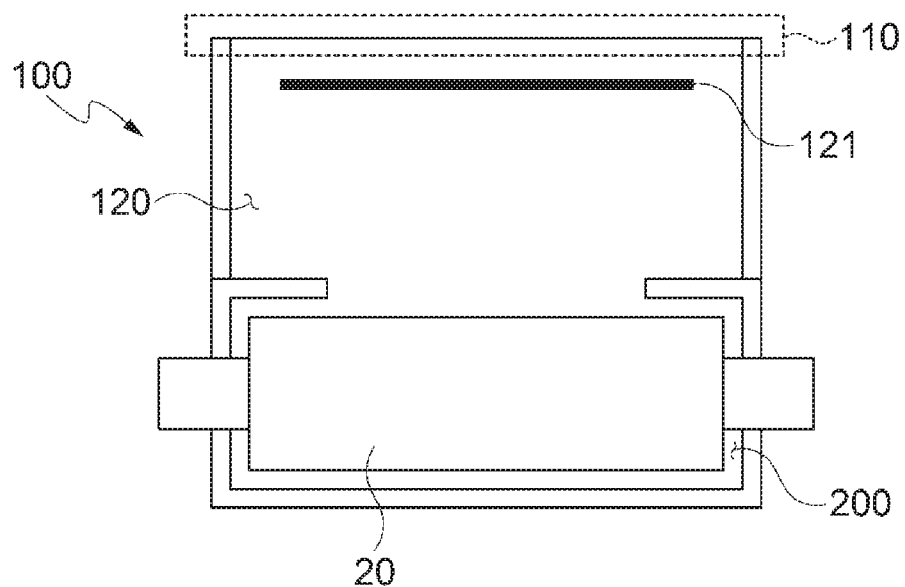
FIG. 1 is a fluoroscopic plan view of a pouch film having an electrode assembly housed therein according to an embodiment of the present invention.

Hereinafter, specific embodiments of the present invention will be described with reference to the accompanying drawings. The following detailed description is provided to contribute to a comprehensive understanding of a method, apparatus, and/or system described herein. However, these embodiments merely illustrative examples, and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the overall disclosure set forth herein.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, it will be understood that, although the terms first, second, etc. may be used herein to describe various elements, components or sections, these elements, components or sections should not be limited by these terms. These terms are only used to distinguish one element, component or section from another element, component or section. Thus, a first element, component or section discussed below could be termed a second element, component or section without departing from the teachings of the present invention.

Furthermore, directional terms such as "one side," "the other side," "upper," "lower," and the like are used in connection with the orientation of the disclosed drawings. Since the components of the embodiments of the present invention may be located in various orientations, the directional terms are used for illustrative purposes, and are not intended to limit the present invention thereto.

FIG. 1 is a fluoroscopic plan view of a pouch film having an electrode assembly housed therein according to an embodiment of the present invention. FIG. 1 is a view illustrating in such a way that an inside of a pouch film 10 is viewed, and seeing through an upper side so as to more clearly understand an inner space of the pouch film 10 for a clear understanding of the invention, but the upper side is not opened.

The pouch film 10 according to the embodiment of the present invention may include a housing section 200 and a gas chamber section 100 integrally formed therewith.

The housing section 200 may provide a space in which an electrode assembly 20 is housed. The electrode assembly 20 may mean a laminate in which electrodes such as a cathode and an anode are repeatedly laminated with a separation membrane (not shown) interposed therebetween. Therefore, the electrode assembly 20 may have a volume of a predetermined size or more. Thus, the housing section 200 may be formed by denting inward unlike other adjacent portions in the pouch film 10. As described below, after the electrode assembly 20 is housed in the housing section 200, an electrolyte (not shown) may be injected.

Figure 2:
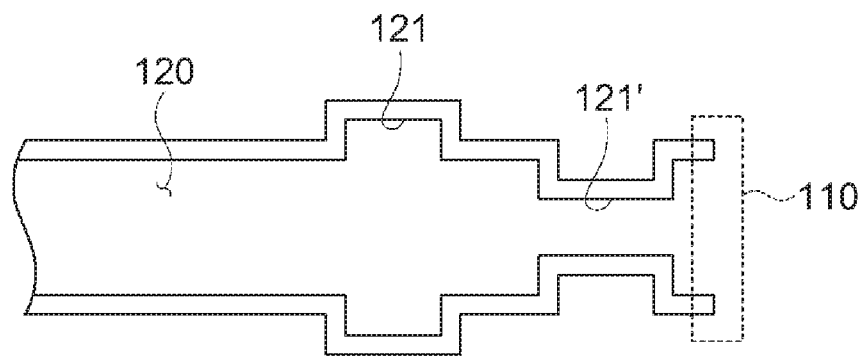
FIG. 2 is a cross-sectional view illustrating a gas chamber section of the pouch film according to the embodiment of the present invention.
Figure 3:
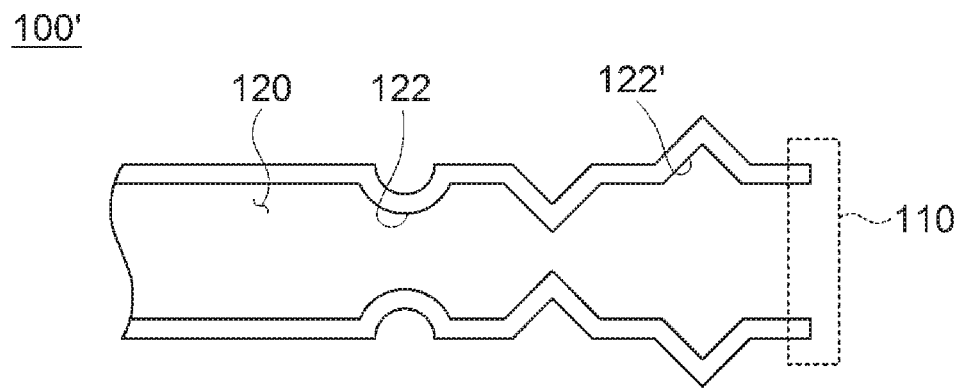
FIG. 3 is a cross-sectional view of a gas chamber section of a pouch film according to another embodiment of the present invention.

The gas chamber section 100 may be a portion other than the housing section 200 in the pouch film 10. Specifically, as illustrated in FIG. 1, the gas chamber section 100 may be a portion formed by extending one of portions forming the housing section 200 in a plane direction thereof. However, as illustrated in FIGS. 2 and 3, since the gas chamber section 100 serves as a gas passage, this section is not the portion formed by extending from only one surface of four surfaces of the housing section 200, but may have a form of a tube which is formed by extending from one surface and disposing another surface parallel to the one surface with being spaced apart therefrom, thus to allow a gas to be discharged to an outside.

The gas chamber section 100 may include a gas chamber inlet 110 and a gas chamber passage 120.

The gas chamber inlet 110 of the pouch film 10 may be a portion into which the electrolyte is injected during injecting the electrolyte into the housing section 200 of the pouch film 10. The gas chamber inlet 110 may vary in a size depending on a device for supplying the electrolyte, thus it is not limited to the portion indicated as illustrated in FIG. 1. The device for supplying the electrolyte may be directly connected to the pouch film 10, or indirectly connected thereto through a separate configuration such as a tube to inject the electrolyte into the housing section 200.

In addition, the gas chamber inlet 110 may be a portion from which a gas generated during injecting the electrolyte into the electrode assembly 20 then pre-charging is discharged to the outside.

The gas chamber passage 120 may be a connection passage through which a gas generated by a reaction between the electrolyte and the electrode assembly 20 is discharged after the electrode assembly 20 is housed in the housing section 200. Therefore, the gas chamber passage 120 may be a portion which is formed by extending a part of portions that do not correspond to the housing section 200 of the pouch film 10 by a predetermined length or more.

The gas chamber inlet 110 and the gas chamber passage 120 may be integrally formed. Herein, these terms may be arbitrarily divided according to functions performed by these parts for a clear understanding of the invention. The gas chamber inlet 110 of the gas chamber section 100 may be not only a portion in which the device for injecting the electrolyte, or the like can be connected in communication with the outside, but also a portion from which the gas generated by pre-charging is discharged while being in contact with the outside, and the gas chamber passage 120 may be a portion that serves as a passage when the electrolyte flows into the housing section 200 within the pouch film 10 and the gas generated during the pre-charging is discharged.

The gas chamber section 100 may have a deformation part 121 formed therein in a predetermined pattern. Specifically, the gas chamber passage 120 may include the deformation part 121 formed in the predetermined pattern, and the deformation part 121 may be formed adjacent to the gas chamber inlet 110 so as to maintain the shape thereof. The deformation part 121 included in the gas chamber passage 120 may perform various functions.

The deformation part 121 may serve to maintain the shapes of the gas chamber inlet 110 and a portion adjacent to the gas chamber inlet 110. Since the pouch film 10 is made of a metal material having excellent elongation, a rigidity thereof may not be strong. Therefore, it may be deformed even by a small external force applied thereto.

For example, the electrolyte may move through the gas chamber inlet 110 and the gas chamber passage 120 to fill the housing section 200. When a large amount of the electrolyte inflows into the pouch film 10 at a time or inflows in a moment at a high speed, a case, in which the gas chamber inlet 110 side is excessively opened due to the pressure applied to the pouch film 10 by the electrolyte, may occur. When the gas chamber inlet 110 side is excessively opened, the electrolyte may flow down without being completely injected into the housing section 200.

Therefore, during injecting the electrolyte through the deformation part 121 of the predetermined pattern, the deformation part 121 may serve to maintain the shapes of the gas chamber inlet 110 and the portion adjacent to the gas chamber inlet 110.

In addition, the deformation part 121 may control a flow of the electrolyte. Controlling the flow of the electrolyte may mean controlling a direction in which the electrolyte flows. In addition, it is not necessary to mean only the direction in which the electrolyte is injected into the pouch film 10.

For example, the deformation part 121 having a curved shape may prevent the electrolyte from splashing to the outside in a moment or the electrolyte from flowing out of the pouch film 10 even if a large amount of the electrolyte inflows into the pouch film 10 side at a time.

In addition, when additionally injecting the electrolyte while the housing section 200 is filled with the electrolyte up to a level, a case, in which the electrolyte contained in the housing section 200 may slop or flow out of the housing section 200 while slopping due to a movement of the additionally injected electrolyte, may occur. In such a case, when forming the deformation part 121 on a portion of the gas chamber section 100 adjacent to the housing section 200 in a direction opposite to a space in which the housing section 200 is formed, it is possible to prevent the electrolyte from flowing backward.

The deformation part 121 may be a portion in which the pouch film 10 is deformed. As a method of deformation, it is possible to use deformation by heat, deformation in a form of changing a thickness or material of a part of the pouch film 10, deformation such as adding a substance, or the like, but it is not limited thereto. However, it is preferable that the deformation part 121 is formed through insert molding. The reason is that the insert molding may be more advantageous in terms of controlling the size of the deformation part, or the like than the deformation by heat, and in the case of deformation such as changing a material or adding a substance, portions to be subsequently used as the secondary battery and portions forming the gas chamber section 100 should be made using different materials or works from each other, such that additional processing may be required.

The gas chamber section 100 may be a portion which is removed after completely releasing the gas generated by the reaction between the electrode assembly 20 and the electrolyte when manufacturing the secondary battery. The purpose of this section is to minimize the size of the space occupied by the pouch film 10 in terms of an energy density of the secondary battery. FIG. 1 illustrates that an advancing direction of the electrolyte during injecting the electrolyte and a discharge direction of the gas generated during the pre-charging are opposite to each other, and the deformation part 121 is perpendicular to these directions, but it is not limited thereto. The deformation part 121 may not be parallel to the advancing direction of the electrolyte and the discharge direction of the gas generated during the pre-charging. The configuration in which the deformation part 121 is not parallel to the above directions may not necessarily mean that the deformation part 121 is formed so as not to be parallel to these directions.

For example, the deformation part 121 may be formed in a broken line shape rather than a straight line shape, and may be formed in a curved shape. That is, when describing based on FIG. 1, the straight line-shaped deformation part 121 may be replaced with the broken line or curve-shaped deformation part. Although the deformation part 121 is not perpendicular to the traveling direction and the discharge direction of the gas generated during the pre-charging even when forming in the broken line or curved shape, the deformation part 121 may perform the function of maintaining the shape of the gas chamber inlet 110 in order to smoothly discharge the gas generated during the pre-charging.

FIG. 2 is a cross-sectional view illustrating the gas chamber section of the pouch film according to the embodiment of the present invention.

The deformation part 121 of the predetermined pattern may be formed in a concave shape, a convex shape, or a combination of the concave and convex shapes.

FIG. 2 shows that the concave shape and the convex shape are formed together, but it is not limited thereto, and the deformation part may be formed only in the concave shape, and the deformation part may be formed only in the convex shape.

Forming deformation parts 121 and 121' in a concave or convex shape means that the pouch film 10 is dented or extended to an outer side of the pouch film 10 toward the passage through which the gas generated by the reaction between the electrolyte and the electrode assembly 20 moves to the outside.

FIG. 2 is merely one example to show that each of the deformation parts 121 and 121' may have different depths in which they are dented or expanded, and that the shapes of the deformation parts 121 and 121' may have both concave and convex. Therefore, the deformation parts 121 and 121' may be formed in such a way that one pattern is repeated or a plurality of patterns are arranged without periodicity.

FIG. 3 is a cross-sectional view of a gas chamber section of a pouch film according to another embodiment of the present invention.

A deformation part 122 formed in a predetermined pattern may have at least one of straight line, curve, dot, polygonal and circular shapes.

A plurality of deformation parts 122 and 122' may be formed in a gas chamber passage 120. In addition, the plurality of deformation parts 122 and 122' may be formed in such a way that one or more patterns repeated to have a certain periodicity, or a plurality of patterns are arranged without periodicity.

Having a straight or curved shape may mean that the deformation part is formed to have a continuous line shape so as to be oriented in a transverse or longitudinal direction on the pouch film 10.

The dot shape may mean a shape in which the deformation parts are embossed on the pouch film 10. Therefore, the pouch film 10 may have a structure for strengthening the gas chamber section 100 by forming several to several tens of dot-shaped deformation parts thereon.

The circular and polygonal-shaped deformation parts may literally mean a shape in which one or more circles or polygons are formed on the pouch film 10. There is no limit to the size of the circle or polygon.

In the case of having the above-described shape, since the deformation part may be concavely or convexly formed in the pouch film 10, it cannot be seen as a separate shape from the deformation part illustrated in FIG. 2, and the deformation part having the dot and circular shapes cannot be also seen as a separate shape at all.

The division of terms with respect to the various shapes in the present disclosure is not intended to limit the shapes meant by each term, but for the purpose of clear understanding of the invention.

Figure 4:
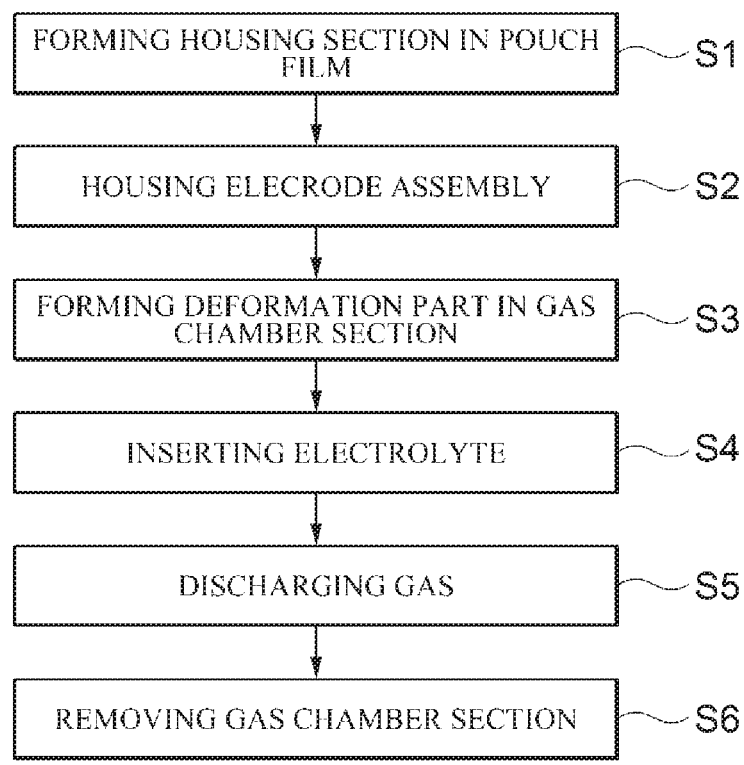
FIG. 4 is a flowchart illustrating a method of manufacturing the secondary battery according to embodiments of the present invention.

FIG. 4 is a flowchart illustrating a method of manufacturing the secondary battery according to embodiments of the present invention.

A secondary battery may be manufactured using the pouch film 10 according to the embodiments of the present invention.

Specifically, the secondary battery may be manufactured using the pouch film 10 which includes the housing section 200 for housing the electrode assembly 20 and the gas chamber section 100 which may be integrally formed with the housing section 200 to discharge a gas generated by the reaction between the electrode assembly 20 and the electrolyte to the outside.

More specifically, it is possible to manufacture a secondary battery by the steps of: forming the housing section 200 in the pouch film (S1), housing the electrode assembly 20 in the housing section 200 (S2), forming the deformation part 121 in the gas chamber section 100 (S3), injecting an electrolyte (S4), discharging the gas generated by the reaction between the electrode assembly 20 and the electrolyte (S5), and removing the gas chamber section 100 from the pouch film (S6).

However, the processes illustrated in FIG. 4 are just one example, and it is not necessary for each step to proceed in the order as illustrated in FIG. 4. That is, the order of the manufacturing method may be changed within a scope of being easily performed by those skilled in the art.

For example, the processes of steps S1 and S2 may be performed after the process of step S3 is preceded, or the processes may be performed in an order of steps S1, S3 and S2. This change in the order may not affect the effects of the invention.

The housing section 200 may be formed in the pouch film 10 through a forming process such as a pressing process. A space in which the electrode assembly 20 is housed may be formed by the forming process.

The deformation part 121 may be formed in the gas chamber section 100 through a molding process such as a pressing process or a notching process for forming a notch. Specifically, the deformation part 121 may be formed by a deep drawing method using a specific type of press, or may be formed by cutting out a certain portion of the film to form a notch.

As described above, the method of forming the deformation part 121 is not limited.

During injecting the electrolyte, a gas may be generated by reacting the electrolyte with the electrode assembly 20. When forming the secondary battery by sealing without removing the gas, or sealing immediately after injecting the electrolyte, the secondary battery may swell. When the secondary battery swells, it may be disadvantageous in terms of the energy density, and the pouch film 10 may be easily broken even in a small external impact. Therefore, it is preferable that the secondary battery is manufactured by sealing the pouch film 10 after the gas generated by sufficiently reacting the electrolyte with the electrode assembly is discharged and no more gas is generated.

The gas chamber section 100 may serve as a passage for removing the gas as described above. In addition, the electrolyte may be injected through the gas chamber inlet 110 of the gas chamber section 100. In this case, the deformation part 121 formed in the gas chamber passage 120 may control the direction in which the electrolyte is injected to make the electrolyte smoothly flow during injecting the electrolyte.

In addition, the deformation part 121 may also serve to prevent the electrolyte from flowing backward to the gas chamber passage 120 even when the housing section 200 is fully filled with the electrolyte.

The gas chamber section 100 may be removed when manufacturing the secondary battery. Since the secondary battery is important in terms of the energy density, after the gas generated by the reaction between the electrolyte and the electrode assembly 20 is removed, if the gas chamber section 100 is left as it is, the space occupied by the secondary battery may be increased and the weight may also be increased, such that it is preferable to remove the gas chamber section 100.

Although the representative embodiments of the present invention have been described in detail, it will be understood by persons who have a common knowledge in the technical field to which the present invention pertains that various modifications and variations may be made therein without departing from the scope of the present invention.

Accordingly, the scope of the present invention should not be limited to the embodiments, but be defined by the appended claims as well as equivalents thereof.

DESCRIPTION OF REFERENCE NUMERALS

10: Pouch film
20: Electrode assembly
100: Gas chamber section
110: Gas chamber inlet
120: Gas chamber passage
121: Deformation part
122: Deformation part

What is claimed is:
1. A pouch film comprising:
a housing section, configured to provide a space in which an electrode assembly is housed; and
a gas chamber section formed integrally with the housing section and configured to discharge a gas generated by reacting an electrolyte with the electrode assembly to an outside,
wherein the gas chamber section includes:
a gas chamber passage extending from the housing section, communicating with the housing section, and configured to serve as a passage of the electrolyte flowing into the housing section and to discharge the gas from the housing section;
a deformation part, extending from the gas chamber passage in a direction in which the gas chamber passage extends, communicating with the gas chamber passage, and being spaced apart from the housing section; and
a gas chamber inlet extending from the deformation part, and communicating with the deformation part so that the electrolyte is injected through the gas chamber inlet into the electrode assembly,
wherein a cross section of the deformation part is in a combination of concave and convex shapes, wherein the deformation part is formed to have an elongated shape traversing a direction in which the gas chamber inlet extends, and wherein the deformation part is configured to maintain a shape of the gas chamber inlet.

2. The pouch film according to claim 1, wherein the deformation part is formed by denting or expanding a portion of the gas chamber.

3. The pouch film according to claim 1, wherein the deformation part has at least one of straight line, curve, polygonal, dot and circular shapes.

4. The pouch film according to claim 1, wherein the deformation part controls a flow of the electrolyte.

5. A method of manufacturing a secondary battery, comprising:

preparing a pouch film which comprises: a housing section configured to house an electrode assembly; and a gas chamber section formed integrally with the housing section and configured to discharge a gas generated by reacting an electrolyte with the electrode assembly to an outside, wherein the gas chamber section includes a gas chamber passage extending from the housing section, communicating with the housing section, and configured to serve as a passage of the electrolyte flowing into the housing section and to discharge the gas from the housing section, and a gas chamber inlet extended from the gas chamber passage;

forming a deformation part by denting or expanding a portion of the gas chamber section in a predetermined shape;

housing the electrode assembly in the housing section;

injecting the electrolyte through the gas chamber inlet formed on one side of the gas chamber section;

discharging a gas generated by reaction between the electrolyte and the electrode assembly to the gas chamber section; and removing the gas chamber section and sealing the housing section, wherein the deformation part is formed to have an elongated shape traversing a direction in which the gas chamber inlet extends, wherein a cross section of the deformation part is in a combination of concave and convex shapes, and wherein the deformation part is configured to maintain a shape of the gas chamber inlet.

6. The method of manufacturing a secondary battery according to claim 5, wherein a plurality of deformation parts are formed in the predetermined shape.

7. The method of manufacturing a secondary battery according to claim 6, wherein the predetermined shape has at least one of straight line, curve, polygonal, dot and circular shapes.

* * * * *